United States Patent Office 3,530,117
Patented Sept. 22, 1970

3,530,117
Δ⁴ AND Δ⁴,⁶ - 17 - HYDROXY - STEROIDAL PYRAZOLES OF THE PREGNANE SERIES
Avery Rosegay, Springfield, Ralph F. Hirschmann, Scotch Plains, Gerald J. Kent, Princeton, and Arthur A. Patchett, Metuchen, N.J., assignors to Merck & Co., Inc., Rahway, N.J., a corporation of New Jersey
No Drawing. Continuation of application Ser. No. 626,341, Mar. 27, 1967, which is a continuation of application Ser. No. 262,304, Mar. 4, 1963. This application Jan. 9, 1969, Ser. No. 791,877
Int. Cl. C07c *173/10*
U.S. Cl. 260—239.5               7 Claims

ABSTRACT OF THE DISCLOSURE

This invention is concerned generally with novel [3,2-c]pyrazole compounds of the pregnane series, and with processes of preparing the same. More particularly, it relates to 17α-hydroxy-2-oxo-4-pregneno- (and 4,6-pregnadieno)-[3,2-c]pyrazoles, and to processes of making these compounds.

---

This is a continuation of application Ser. No. 626,341 filed Mar. 27, 1967, now abandoned, which is a continuation of application Ser. No. 262,304 filed Mar. 4, 1963, now abandoned, which is a continuation-in-part of copending applications Ser. No. 203,748, filed June 20, 1962 now U.S. Pat. No. 3,147,183 which, in turn, is a continuation-in-part of copending applications Ser. No. 88,659, filed Feb. 13, 1961, now U.S. Pat. 3,094,540; Ser. No. 177,169, filed Mar. 5, 1962, now U.S. Pat. 3,072,639; Ser. No. 177,194, filed Mar. 5, 1962, now U.S. Pat. 3,072,640; Ser. No. 177,195, filed Mar. 5, 1962, now U.S. Pat. 3,072,641; and Ser. No. 177,262, filed Mar. 5, 1962, now U.S. Pat. 3,072,642.

These novel [3,2-c]pyrazole compounds may be chemically represented as follows:

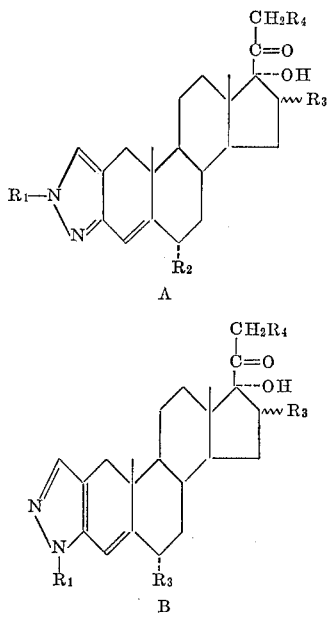

wherein $R_1$ is selected from the group consisting of hydrogen, acyl, alkyl, aralkyl, cycloalkyl, aryl, a heterocyclic nucleus, and substituted derivatives thereof; $R_2$ is selected from the group consisting of hydrogen, α-methyl and α-fluoro; $R_3$ is selected from the group consisting of hydrogen, α-methyl, β-methyl, α-fluoro and methylene; and $R_4$ is selected from the group consisting of hydrogen, fluoro, hydroxy, acyloxy, the dihydrogen phosphate and the alkali metal salts of said dihydrogen phosphate; and salts of all of the foregoing compounds.

This invention also includes the Δ⁴,⁶-analogues of all of the above compounds.

The above defined [3,2-c]pyrazole-steroids possess high anti-inflammatory activity and are especially effective as topical agents and for the treatment of arthritis and related diseases since they can be administered for their cortisone-like action in low dosage thereby minimizing undesirable side effects.

The 17α,21 - dihydroxy - 20-oxo-4-pregnano-(and 4,6-pregnadieno)-[3,2-c]pyrazoles are prepared by the method described in Flow Sheet A, starting from the corresponding 17α,21dihydroxy-4-pregnene-(or 4,6-pregnadiene)-3,20-dione, as defined by Compound 1 of the flow sheet.

The starting materials for Flow Sheet A can be prepared by the introduction of the various substituents, namely the 16α-methyl-, 16β-methyl-, 16-methylene-, 6α-fluoro-, or the 6α-methyl groups into a 17α,21-dihydroxy-4-pregnene-3,20-dione following known procedures capable of general application. More than one substituent may be introduced into the unsubstituted steroid in any order.

The 16α-fluoro-steroids are prepared according to the procedures described in Example 16.

The 17α-hydroxy-20-oxo-4-(pregneno- and 4,6-pregnadieno)-3,20-dione starting materials are similarly prepared for Flow Sheet B. For obtaining a particular compound, the choice of method may be determined by the availability of the starting materials, among other considerations.

Following the synthesis described in Flow Sheet A, a 17α,21-dihydroxy-4-pregnene (or 4,6-pregnadiene)-3,20-dione starting material (Compound 1) is reacted with aqueous formaldehyde solutions in the presence of strong acid. For example, cold concentrated HCl and Formalin are added to a stirred suspension of the steroid in chloroform, cooled to about 0° C. The mixture is then allowed to come to room temperature and stirred for several hours to afford the corresponding 17α,20,20,21-bis(methylenedioxy)-derivative (Compound 2).

Upon treatment of the latter compound with an alkyl formate and sodium hydride in an inert atmosphere there is formed the corresponding 17α,20,20,21-bis(methylenedioxy) - 2-hydroxymethylene-4-pregnene-(or 4,6-pregnadiene)-3-one (Compound 3). In a preferred embodiment of our invention the steroid is dissolved in a solvent such as benzene and the resulting solution is cooled to room temperature and treated with ethyl formate. The air in the system is replaced with nitrogen, sodium hydride is added and the mixture is stirred at room temperature for several hours.

The 17α,20,20,21 - bis(methylenedioxy) - 2 - hydroxymethylene-4-pregnene-(or 4,6-pregnadiene)-3-one compound reacts with hydrazine in an inert atmosphere to form the corresponding 17α,20,20,21-bis(methylenedioxy)-4-pregneno-(or 4,6 - pregnadieno)-[3,2-c]pyrazoles (Compound 4) wherein $R_1$ is hydrogen.

Upon treatment of a 17α,20,20,21-bis(methylenedioxy)-2-hydroxymethylene-4 - pregnene-(or 4,6-pregnadiene)-3-one compound with a lower alkanol in the presence of an acidic reagent such as a p-toluenesulfonic acid the corresponding 17α,20,20,21-bis(methylenedioxy)-2-alkoxymethylene-4-pregnene-(or 4,6 - pregnadiene)-3-one is formed. When the latter is reacted with a mono-substituted hydrazine, there is formed the corresponding N-substituted - 4 - pregneno-(or 4,6-pregnadieno) - [3,2-c] pyrazoles (Compounds 4A and 4B wherein $R_1$ is the radical of the substituent of the hydrazine). The N-substituted-[3,2-c]pyrazoles having structure "A" are designated as the 1'-substituted-[3,2-c]pyrazoles, and the N-substituted-pyrazole compounds having structure "B" are designated as the 2'-substituted-[3,2-c]-pyrazoles.

Upon treatment of a 17α,20,20,21-bis(methylenedioxy)-2-hydroxymethylene compound directly with a monosubstituted arylhydrazine, without the intermediate formation of the 2-alkoxymethylene-derivative, one isomer is generally formed in preponderant amounts, whereas when reacting the 17α,20,20,21-bis(methylenedioxy)-2-alkoxymethylene-compound with a monosubstituted arylhydrazine, significant amounts of both isomers are obtained. When these reactions take place with monosubstituted alkylhydrazines, mixtures may be obtained when starting with the 2-hydroxymethylene-steroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of a trace of alcohol a solution of the 2-hydroxymethylene-compound from which acid has not been completely removed.

Among the monosubstituted hydrazines which may be used for the process of our invention are: alkylhydrazines, such as methylhydrazine, ethylhydrazine, propylhydrazines, butylhydrazines, β-hydroxyethylhydrazine, cycyloalkylhydrazines; arylhydrazines including phenylhydrazine and the substituted phenylhydrazines, such as o-, m-, and p-halophenylhydrazines, o-, m-, and p-tolyhydrazines, o-, m-, and p-alkoxyphenylhydrazines, o-, m-, and p-nitrophenylhydrazines, 1-hydrazinonaphthalene, 2-hydrazinopyridine, 3 - hydrazinopyridine, 4 - hydrazinopyridine, 4-hydrazinopyridine oxide, 2-hydrazinopyrimidine 2- and 3-hydrazinothiophene; aralkylhydrazines, such as benzylhydrazine and phenylethylenehydrazine.

There are thus produced the corresponding [3,2-c] pyrazoles including: N-alkyl such as N-methyl-, N-ethyl-, N-butyl-, N-propyl-, N-(β-hydroxyethyl)-; N-cycloalkyl-; N-aryl- which may be derived from any aromatic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N - (1''-naphthyl)-, N - (2''pyridyl)-, N - (3''-pyridyl)-, N-(4''-pyridyl)-, N-(4''-pyridyloxide)-, N-(2''-pyrimidyl)-; N-(2''-thiophene)- and N-(3''-thiophene)- N-aralkyl-, such as N-benzyl and N-phenylethenyl- pyrazole compounds. The N-alkyl-pyrazole compounds may also be prepared by direct alkylation of the N-unsubstituted-pyrazole compounds.

Upon treatment of any of the above described 17α,20,20,21 - bis(methylenedioxy) - [3,2-c]pyrazole compounds (Compounds 4A and 4B) with a dilute organic acid, for example, a 60% aqueous solution of formic acid, the 17α,20,20,21-bis(methylenedioxy)-protecting group is removed and there is obtained the corresponding 17α,21-dihydroxy - 20 - oxo - [3,2-c]pyrazoles which are represented by Compounds 5A and 5B. Any acyl groups present at R₁ or at the 21-position may be removed by treating the steroid with sodium methoxide in methanol at room temperature.

Among the compounds of our invention are included:

17α,21-dihydroxy-20-oxo-4-pregneno-[3,2-c]pyrazole,
16α-fluoro-17α,21-dihydroxy-20-oxo-4-pregneno-[3,2-c]pyrazole,
6α-fluoro-17α,21-dihydroxy-20-oxo-4-pregneno-[3,2-c]pyrazole,
17α,21-dihydroxy-6α-methyl-20-oxo-4-pregneno-[3,2-c]pyrazole,
17α,21-dihydroxy-16α-methyl-20-oxo-4-pregneno-[3,2-c]pyrazole,
17α,21-dihydroxy-16β-methyl-20-oxo-4-pregneno-[3,2-c]pyrazole,
17α,21-dihydroxy-16-methylene-20-oxo-4-pregneno-[3,2-c]pyrazole,
17α,21-dihydroxy-20-oxo-2'-phenyl-4-pregneno-[3,2-c]pyrazole,
16α-fluoro-17α,21-dihydroxy-20-oxo-2'-phenyl-4-pregneno-[3,2-c]pyrazole,
6α-fluoro-17α,21-dihydroxy-20-oxo-2'-phenyl-4-pregneno-[3,2c]pyrazole,
17α,21-dihydroxy-6α-methyl-20-oxo-2'-phenyl-4-pregneno-[3,2-c]pyrazole,
17α,21-dihydroxy-16α-methyl-20-oxo-2'-phenyl-4-pregneno-[3,2c]pyrazole,
17α,21-dihydroxy-16β-methyl-20-oxo-2'-phenyl-4-pregneno-[3,2-c]pyrazole,
17α-21-dihydroxy-16-methylene-20-oxo-2'-phenyl-4-pregneno-[3,2-c]pyrazole,
17α,21-dihydroxy-20-oxo-2'-(p-fluoro-phenyl)-4-pregneno-[3,2-c]pyrazole,
16α-fluoro-17α,21-dihydroxy-20-oxo-2'-(p-fluorophenyl)-4-pregneno-[3,2-c]pyrazole,
6α-fluoro-17α,21-dihydroxy-20-oxo-2'-(p-fluorophenyl)-4-pregneno-[3,2-c]pyrazole,
17α,21-dihydroxy-6α-methyl-20-oxo-2'-(p-fluorophenyl)-4-pregneno-[3,2-c]pyrazole,
17α,21-hydroxy-16α-methyl-20-oxo-2'-(p-fluorophenyl)-4-pregneno-[3,2-c]pyrazole,
17α,21-dihydroxy-16β-methyl-20-oxo-2'-(p-fluorophenyl)-4-pregneno-[3,2-c]pyrazole,
17α,21-dihydroxy-16-methylene-20-oxo-2'-(p-fluorophenyl)-4-pregneno-[3,2-c]pyrazole,
17α,21-dihydroxy-20-oxo-4,6-pregnadieno-[3,2-c[ pyrazole,
16α-fluoro-17α,21-dihydroxy-20-oxo-4,6-pregnadieno-[3,2-c]pyrazole,
6-fluoro-17α,21-dihydroxy-20-oxo-4,6-pregnadieno-[3,2-c]pyrazole,
17α,21-dihydroxy-6-methyl-20-oxo-4,6-pregnadieno-[3,2-c]pyrazole,
17α,21-dihydroxy-16α-methyl-20-oxo-4,6-pregnnadieno-[3,2-c]pyrazole,
17α,21-dihydroxy-16β-methyl-20-oxo-4,6-pregnadieno-[3,2-c]pyrazole,
17α,21-dihydroxy-16-methylene-20-oxo-4,6-pregnadieno-[3,2-c]pyrazole,
16α-fluoro-16α-fluoro-17α,21-dihydroxy-20-oxo-2'-phenyl-4,6-pregnadieno-[3,2-c]pyrazole,
6-fluoro-17α,21-dihydroxy-20-oxo-2'-phenyl-4,6-pregnadieno-[3,2-c]pyrazole,
17α,21-dihydroxy-6-methyl-20-oxo-2'-phenyl-4,6-pregnadieno-[3,2-c]pyrazole,
17α,21-dihydroxy-16α-methyl-20-oxo-2'-phenyl-4,6-pregnadieno-[3,2-c]pyrazole,
17α,21-dihydroxy-16β-methyl-20-oxo-2'-phenyl-4,6-pregnadieno-[3,2-c]pyrazole,
17α,21-dihydroxy-16-methylene-20-oxo-2'-phenyl-4,6-pregnadieno-[3,2-c]pyrazole,
17α,21-dihydroxy-20-oxo-2'-(p-fluorophenyl)-4,6-pregnadieno-[3,2-c]pyrazole,
16α-fluoro-17α,21-dihydroxy-20-oxo-2'-(p-fluorophenyl)-4,6-pregnadieno-[3,2-c]pyrazole,
6-fluoro-17α,21-dihydroxy-20-oxo-2'-(p-fluorophenyl)-4,6-pregnadieno-[3,2-c]pyrazole,
17α,21-hydroxy-6-methyl-20-oxo-2'-(p-fluorophenyl)-4,6-pregnadieno-[3,2-c]pyrazole,
17α,21-dihydroxy-16α-methyl-20-oxo-2'-(p-fluorophenyl)-4,6-pregnadieno-[3,2-c]pyrazole,
17α,21-dihydroxy-16β-methyl-20-oxo-2'-(p-fluorophenyl)-4,6-pregnadieno-[3,2-c]pyrazole,
17α,21-dihydroxy-16-methylene-20-oxo-2'-(p-fluorophenyl)-4,6-pregnadieno-[3,2-c]pyrazole, as well as the 1'- and 2'-alkyl, and 1'- and 2'-aryl, derivatives thereof.

The 21-acyl derivatives (Compound 8 of Flow Sheet A) are prepared from the N-substituted 21-hydroxy-[3,2-c]pyrazoles by treating with one equivalent of an acylating agent, e.g. a lower hydrocarbon carboxylic acid acylating agent such as benzoic anhydride, tertiary butyl acetyl chloride; a lower alkanoic anhydride or lower alkanoyl halide such as acetic anhydride, propionic anhydride; or a polybasic anhydride such as β,β-dimethylglutaric anhydride, succinic anhydride and the like, in the presence of an organic base such as pyridine.

The 21-acyl derivatives of the N-unsubstituted [3,2-c] pyrazoles are prepared by reacting the latter compounds with 2-equivalents of the acylating agent to form the N-acyl-21-acylate and then heating the latter compound with aqueous acetic acid, whereupon the N-acyl group is selectively removed.

The 17α,21-dihydroxy-[3,2-c]pyrazole (Compound 5) is reacted with methane sulfonyl chloride in a non-aqueous base to form the 21-mesylate (Compound 6). A steroid in which $R_1$ is hydrogen is preferably converted to the N-carbamyl derivative before undergoing this reaction.

The 21-fluoro-17α-hydroxy-[3,2-c]pyrozoles (Compound 9) are prepared from the corresponding 17α,21-dihydroxy-[3,2-c]pyrazole 21-mesylate (Compound 6) by heating with an alkali fluoride in a solvent to form a mixture of a 17α,21-epoxy-compound and the corresponding 21-fluoro-compound. These compounds are separated by partition chromatography, or by chromatography on a weak adsorbent such as silica gel. There are thus obtained the 21-fluoro-analogues of all of the 21-hydroxy compounds named in columns 3 and 4.

The 17α,21-dihydroxy-[3,2-c]pyrazole 21-mesylate (Compound 6) is heated with an alkali iodide to form the 21-iodo-compound (Compound 7). In a preferred method for carrying out this reaction, sodium iodide is added to the steroid dissolved in acetone and the resulting mixture is heated at reflux temperature for approximately one hour.

The 17α-hydroxy-21-iodo-[3,2-c]pyrazole is heated with an alkali bisulfite in a solvent to form the corresponding 21-desoxy-compound (Compound10). A preferred method is to add sodium bisulfite to a suspension of the steroid in aqueous ethanol and then heat the mixture under reflux for a period of about an hour. There are thus obtained the 21-desoxy derivatives of all of the compound listed in columns 3 and 4.

An N-carbamyl group present at $R_1$ is removed by treatment with nitrous acid. For example, the steroid is treated in glacial acetic acid solution with sodium nitrite.

The 21-dihydrogen phosphate esters of all of the 21-hydroxy-compounds listed are prepared by the reaction of the 21-iodo steroid (Compound 7) with a mixture of silver phosphate and phosphoric acid. Both the mono- and dialkali metal salts may be obtained by neutralization of the dihydrogen phosphate ester with an alkali methoxide. Treatment with additional amounts of alkali methoxide will convert an N-acyl-steroid ($R_1$-acyl) into the free amine ($R_1$-H) dialkali metal salt from which the dihydrogen phosphate can be obtained by contacting with an ion exchange resin.

Following the synthesis described in Flow Sheet B, the 17α-hydroxy-4-pregnene- (or 4,6-pregnadiene)-3,20-dione (Compound 12) is converted into the 17α-tetrahydropyranyl ether (Compound 13). This may be accomplished by refluxing under anhydrous conditions with dihydropyran in the presence of an acidic reagent such as tosyl chloride.

The 17α-tetrahydropyranyloxy-4-pregnene- (or 4,6-pregnadiene)-3,20-dione is reduced to the corresponding 17α-tetrahydropyranyloxy-4-pregnene- (or 4,6-pregnadiene)-3,20-diol (Compound 14), for example, by heating with lithium aluminum hydride in a solvent such as tetrahydrofuran. The 17α-tetrahydropyranyloxy-4-pregnene- (or 4,6-pregnadieno)-3,20-diol is then oxidized to 17α-tetrahydropyranyloxy-20-hydroxy-4-pregnene- (or 4,6-pregnadiene)-3-one (Compound 15), conveniently by the use of manganese dioxide.

Upon treatment of the 17α-tetrahydropyranloxy-20-hydroxy-4-pregnene- (or 4,6-pregnadiene)-3-one with an alkyl formate and sodium hydride in an inert atmosphere there is formed the corresponding 2-hydroxymethylene-derivative (Compound 16). The 2-hydroxymethylene derivative reacts with hydrazine in an inert atmosphere to form the corresponding 4-pregneno-(or 4,6-pregnadieno)-[3,2-c]pyrazole (Compound 17).

Upon treatment of the 2-hydroxymethylene-4-pregnene-(or 4,6-pregnadieno)-3-one (Compound 16) with a lower alkanol in the presence of an acidic reagent, such as a p-toluenesulfonic acid, the corresponding 2-alkoxymethylene-derivative is formed. When the latter compound is reacted with a monosubstituted hydrazine, the corresponding N-substituted-4-pregneno-(or 4,6-pregnadieno)-[3,2-c]pyrazole compounds (Compounds 17A and 17B) are formed. The N-substituted-4-pregneno-(or 4,6-pregnadieno)-[3,2-c]pyrazoles having structure A are designated as the 1'-substituted-4-pregneno-[3,2-c]pyrazoles, and the N-substituted-pyrazole compounds having structure B are designated as the 2'-substituted-4-pregneno-[3,2-c]pyrazoles. The corresponding 4,6-pregnadieno-[3,2-c]pyrazoles are similarly designated as the 1'- and 2'-substituted-4,6-pregnadieno-[3,2-c]pyrazoles.

Upon treatment of the 2-hydroxymethylene-compound directly with a monosubstiuted arylhydrazine, without the intermediate formation of the 2-alkoxymethylene compound, one isomer is generally formed in preponderant amounts, whereas when reacting the 2-alkoxymethylene compound with a monosubstituted arylhydrazine, significant amounts of both isomers are obtained. When these reactions take place with monosubstituted alkylhydrazines, mixtures may be obtained starting with the 2-hydroxymethylene-steroid as well as with the 2-alkoxymethylene-steroids. A mixture of isomers may also result from the reaction of a monosubstituted hydrazine with a 2-hydroxymethylene compound which possibly contains variable amounts of the 2-alkoxymethylene-compound due to the operating procedures employed, for example, due to recrystallization in the presence of a trace of alcohol a solution of the 2-hydroxymethylene-compound from which acid has not been completely removed.

The monosubstituted hydrazines which may be used for the process of Flow Sheet B are those listed in column 3. There are thus produced the corresponding [3,2-c]pyrazoles, as indicated in columns 3 and 4.

The 17α-tetrahydropyranyloxy-20-hydroxy-4-pregneno-(or 4,6-pregnadieno)-[3,2-c]pyrazoles (Compound 17) are oxidized to the corresponding 17α-tetrahydropyranyloxy - 20 - oxo-4-pregneno-(or 4,6-pregnadieno)-[3,2-c] pyrazoles (Compound 18), suitably by using a chromium trioxide sulfuric acid reagent which is prepared by dissolving chromium trioxide in concentrated sulfuric acid, and then diluting with water.

The 17α - tetrahydropyranyloxy-20-oxo-4-pregneno-(or 4,6-pregnadieno)-[3,2-c]pyrazoles (Compound 18) are converted into the corresponding 17α-hydroxy-derivatives (Compound 19) by dissolving in methanol and treating with a solution of p-toluenesulfonic acid monohydrate in methanol.

All of the [3,2-c]pyrazoles described in the foregoing structures form salts such as the hydrochloride, sulfate, chlorate, perchlorate, picrate and trichloroacetate, on treatment with the corresponding acid. Formation of crystalline salts, especially the hydrochloride salts is sometimes helpful as a means of purifying the [3,2-c]pyrazoles.

A further embodiment of our invention comprises novel pharmaceutical compositions containing the novel [3,2-c] pyrazolo compounds of the pregnane series, exemplified in the foregoing structures.

The following examples illustrate methods of carrying out the present invention but it is to be understood that these examples are given for purposes of illustration and not of limitation.

FLOW SHEET A
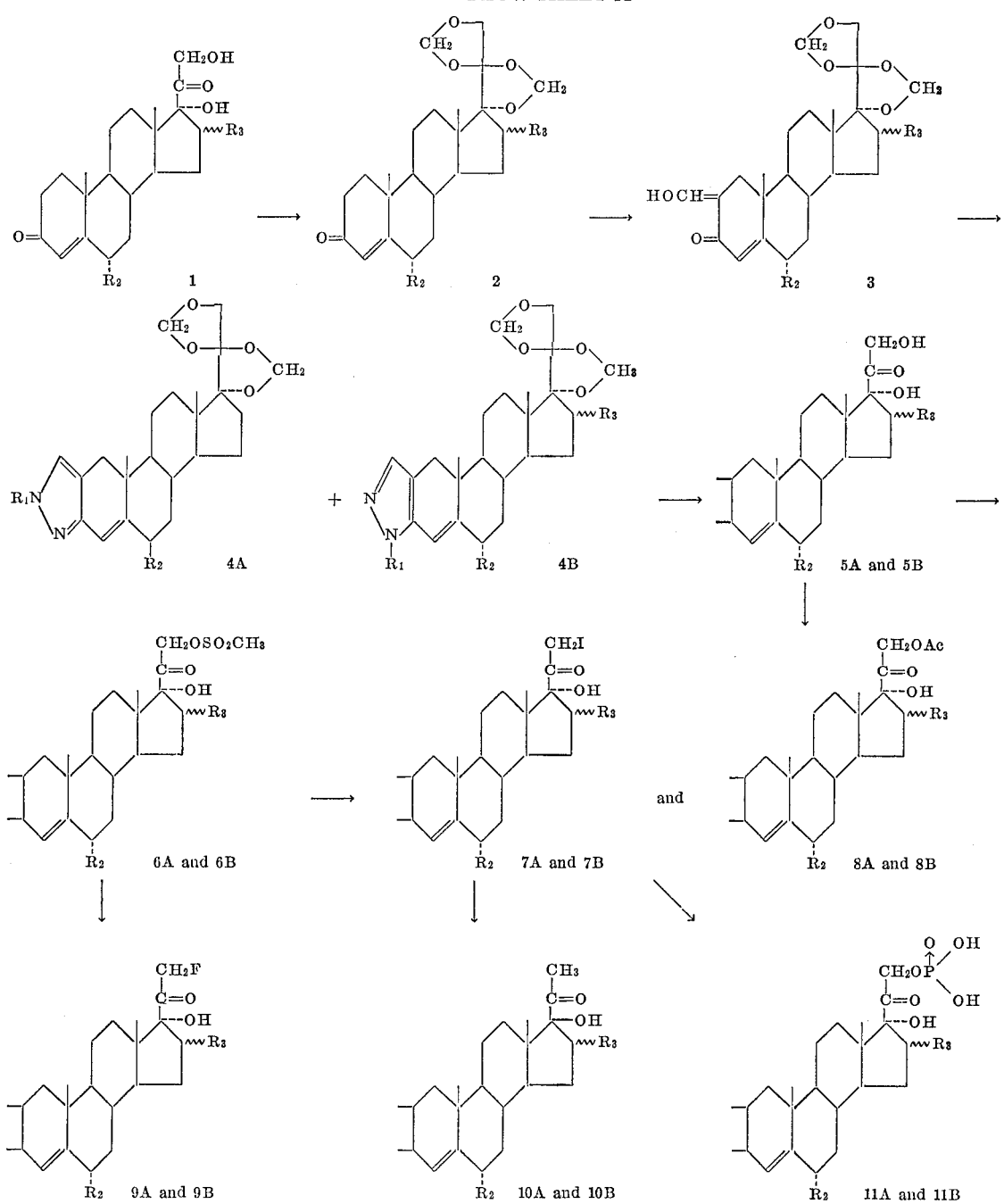
wherein $R_2$ is selected from the group consisting of hydrogen, α-methyl and α-fluoro and $R_3$ is selected from the group consisting of hydrogen, α-methyl, β-methyl, α-fluoro and methylene. This flow sheet also includes the $\Delta^{4,6}$- analogues of the compounds shown.
FLOW SHEET B
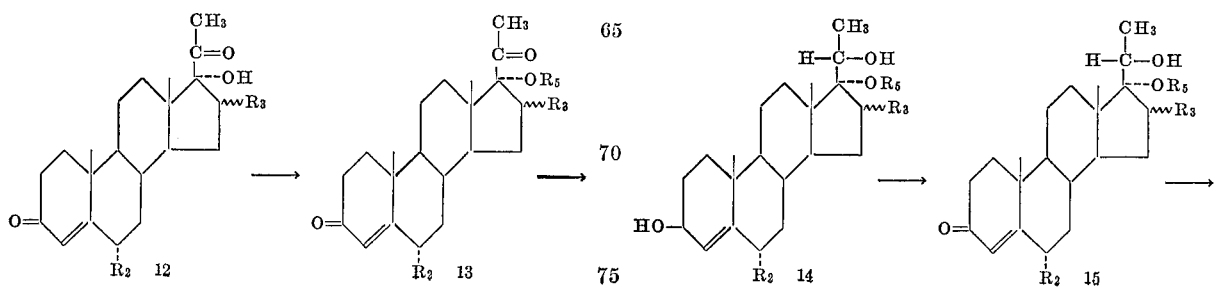

FLOW SHEET B—Continued

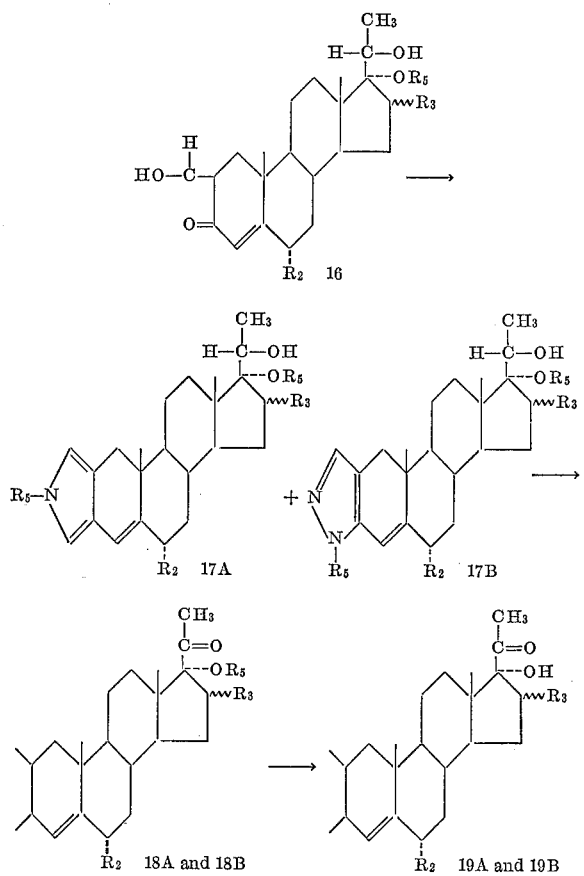

wherein R₂ is selected from the group consisting of hydrogen, α-methyl and α-fluoro; R₃ is selected from the group consisting of hydrogen, α-methyl, β-methyl, α-fluoro and methylene; and R₅ is tetrahydropyranyl. This flow sheet also includes the $\Delta^{4,6}$-analogues of the compounds shown.

EXAMPLE 1

A solution of 10 g. of 17α-hydroxy-4-pregnene-3,20-dione in 3 g. of tosyl chloride and 150 ml. of dihydropyran, B.P. 86° C., distilled from sodium hydride, is refluxed for 18 hours. After cooling, 100 ml. of 10% sodium carbonate solution is added, and the mixture is stirred for 1 hour. The organic layer is separated, washed with saturated salt solution, dried over magnesium sulfate, and concentrated under reduced pressure to a viscous residue. The residue is dissolved in 50 ml. of a 4:1 mixture of n-hexane-benzene and chromatographed on basic alumina. The product is crystallized by dissolving in 2 parts of methylene chloride and adding about 16 parts of n-hexane. Successive processing of the mother liquor yields a total of 7.1 g. of 17α-tetrahydropyranyloxy-4-pregnene-3,20-dione, M.P. about 155–65° C.

EXAMPLE 2

A mixture of 3.6 g. of 17α-tetrahydropyranyloxy-4-pregnene-3,20-dione, 2.0 g. of lithium aluminum hydride and 100 ml. of tetrahydrofuran (distilled over lithium aluminum hydride) is stirred under reflux for 1 hour. About 40 ml. of solvent is then distilled, and the mixture is cooled and treated with ethyl acetate to destroy the excess sodium hydride. With continued stirring, saturated salt solution is added in small portions until a granular deposit of salt is formed. The mixture is filtered, and the filtrate is concentrated under reduced pressure to give 17α-tetrahydropyranyloxy-4-pregnene-3ξ,20-diol, which is a colorless, non-crystalline residue and shows no carbonyl absorption in the infrared.

EXAMPLE 3

The 17α-tetrahydropyranyloxy - 4 - pregnene-3ξ,20-diol obtained in Example 2 is dissolved in 40 ml. of acetone, and 30 g. of activated manganese dioxide is added. The mixture is stirred for 18 hours at room temperature, filtered through infusorial earth (Celite), and the manganese dioxide is washed thoroughly with methylene chloride. The combined filtrates are concentrated under reduced pressure. The residue is dissolved in ether and chromatographed on basic alumina. The column is washed with ether until the eluate is free of residue, and then the product is eluted with a 1:9 solution of chloroform-ether. Evaporation of the solvent leaves a 66% yield of a colorless glass, 17α-tetrahydropyranyloxy-20-hydroxy-4-pregnene-3-one $\lambda_{max.}^{MeOH}$ 241, $E\%$ 362

EXAMPLE 4

Eethyl formate (1.5 ml.) is added to a solution of 1.63 g. of 17α-tetrahydropyranyloxy-20-hydroxy-4-pregnene-3-one in 35 ml. of dry benzene, and the system is flushed with dry nitrogen. Sodium hydride (1.5 g. as a 53% oil dispersion) is added, and after flushing again with nitrogen, the mixture is stirred for 2 hours at room temperature. After cooling, 30 ml. of ether and 30 ml. of a saturated solution of sodium dihydrogen phosphate solution are added, and the mixture is shaken for about 5 minutes. The layers are separated, the water layer is washed with ether, and the combined ether extracts are washed with saturated salt solution. The product is then extracted with six 15 ml. portions of 2% sodium hydroxide solution and the combined basic extracts are washed three times with ether. The alkaline solution is acidified to a pH of 6 using saturated sodium dihydrogen phosphate solution, and then extracted several times with ether. After washing the combined ether extracts with saturated salt solution and then drying over sodium sulfate, partial evaporation of solvent gives 400 mg. of crude, crystalline product, M.P. 152–5° C. The mother liquor is evaporated to dryness and the residue is dissolved in 2 ml. of ether to afford a second crop (450 mg.) of product, M.P. 153–5° C. The total yield of crude product is about 49%;

$\lambda_{max.}^{MeOH}$ (in base) 357 m$\mu$, $E\%$ 231; 242 m$\mu$, $E\%$ 344

Several recrystallizations from methylene chloride-ether gives an analytical sample of 20-hydroxy-2-hydroxymethylene-17α-tetrahydropyranyloxy - 4-pregnene-3-one, M.P. 185–9° C.

$\lambda_{max.}^{MeOH}$ (in base) 357 m$\mu$, $E\%$ 240; 243 m$\mu$, $E\%$ 363

EXAMPLE 5

A solution of 3.5 g. of 17α-tetrahydropyranyloxy-20-hydroxy-2-hydroxymethylene-4-pregnene-3-one and 0.45 ml. of hydrazine hydrate in 30 ml. of ethanol is refluxed under nitrogen for 45 minutes. The solvent is then evaporated under reduced pressure. The residue is flushed with n-hexane and 100 ml. of ether is added. The resulting suspension is shaken thoroughly for several minutes, filtered, and the filtrate evaporated to dryness under reduced pressure, to leave a residue of about 1.6 g. (46%) of 17α-tetrahydropyranyloxy - 20 - hydroxy-4-pregneno-[3,2-c]pyrazole $\lambda_{max.}^{MeOH}$ 260 m$\mu$, $E\%$ 201, 9,000

The ether insoluble fraction shows $\lambda_{max.}^{MeOH}$ 260 m$\mu$, $E\%$ 159

EXAMPLE 6

To a solution of 0.5 millimole of 17α-tetrahydropyranyloxy-20-hydroxy-2-hydroxymethylene-4-pregnene-3-one in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the N-methyl-17α- tetrahydropyranyloxy-20-hydroxy-4-pregneno-[3,2-c]pyrazole is removed by filtration.

A mixture of the 1'-methyl- and 2'-methyl-17α-tetrahydropyranyloxy-20-hydroxy-4-pregneno-[3,2-c]pyrazole is prepared by the following route:

A mixture of 1 gram of 17α-tetrahydropyranyloxy-20-hydroxy - 2 - hydroxymethylene-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α-tetrahydropyranyloxy-20-hydroxy-2-methoxymethylene - 4 - pregnene - 3 - one is obtained by chromatography on acid-washed alumina and elution with ether:chloroform mixtures.

A mixture of 500 mg. of the above 2-methoxymethylene-derivative, 100 ml. of ethanol, and 1 ml. of methylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to yield the 1'-methyl- and the 2'-methyl-17α-tetrahydropyranyloxy-20-hydroxy - 4 - pregneno - [3,2-c]pyrazole.

The N-methyl-17α - tetrahydropyranyloxy - 20 - hydroxy-4-pregneno - [3,2-c]pyrazole may also be prepared by the following procedure: A solution of about 0.47 millimole of 17α - tetrahydropyranyloxy - 20 - hydroxy-4-pregneno-[3,2-c]pyrazole, in 10 ml. of benzene is treated with 30–38 mg. of about 51% sodium hydride (in oil suspension) after the addition of 2–3 ml. of dimethylformamide (dried over calcium hydride) and 5 ml. of methyl iodide, the mixture is stirred at room temperature over night. The product is filtered, washed with methylene chloride, and the filtrate and washings are taken to dryness. The residue is treated with water and the product is filtered to give N-methyl-17α-tetrahydropyranyloxy-20-hydroxy-4-pregneno-[3,2-c]pyrazole.

In accordance with the above procedures, but using other alkylating agents in place of methyl iodide, there are obtained the corresponding N-alkkyl - 17α - tetrahydropyranyloxy-20-hydroxy-4-pregneno-[3,2-c]pyrazole.

In accordance with all of the above procedures, but starting with the 2-hydroxymethylene derivatives defined by compound 16 of Flow Sheet B, there are obtained the corresponding 1'-methyl- and 2'-methyl derivatives.

EXAMPLE 7

A mixture of 90 mg. of 17α - tetrahydropyranyloxy-20-hydroxy - 2 - hydroxymethylene - 4 - pregnene-3-one and 0.028 ml. of phenylhydrazine is refluxed under nitrogen in 1.2 ml. of absolute ethanol for about 50 minutes. The reaction mixture is taken to dryness. Water is added and the product is filtered to give an amorphous colid, which is washed successively with water, dilute acid, water, and petroleum ether. The product is crystallized from methanol to afford a product which is predominately the 2'-phenyl-17α-tetrahydropyranyloxy - 20 - hydroxy-4-pregneno-[3,2-c]pyrazole.

A mixture of the 1'-phenyl- and 2'-phenyl-17α-tetrahydropyranyloxy - 20 - hydroxy-4-pregneno-[3,2-c]pyrazole is prepared by the following route: A mixture of 1 gram of 17α-tetrahydropyranyloxy - 20 - hydroxy-2-hydroxymethylene-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concenerated in vacuo. The 17α-tetrahydropyranyloxy - 20 - hydroxy-2-methoxymethylene-4-pregnene-3-one is obtained by chromatography on acid-washed alumina and elution with ether: chloroform mixtures.

A mixture of 500 mg. of the above 2-methoxymethylene-steroid, 100 ml. of ethanol, and 1 ml. of phenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to yield the 1'-phenyl- and 2'-phenyl-17α-tetrahydropyranyloxy - 20 - hydroxy-4-pregneno-[3,2-c]pyrazole.

In accordance with the above procedures, but starting with the 2-hydroxymethylene-derivative which is obtained from each of the starting materials which are defined by Compound 16 of Flow Sheet E, there are obtained the corresponding 1'-phenyl- and 2'-phenyl-derivatives.

In accordance with the above procedures, but using cyclohexylhydrazine, p-tolylhydrazine, p-chlorophenylhydrazine, p-methoxyphenylhydrazine, or benzylhydrazine in place of phenylhydrazine, there are obtained the corresponding 1'- and 2'-cyclohexyl-, 1'- and 2'-p-tolyl-, 1'- and 2'-p-chlorophenyl-, 1'- and 2'-p-methoxyphenyl-, and 1'- and 2'-benzyl - 17α - tetrahydropyranyloxy - 20 - hydroxy-4-pregneno-[3,2-c]pyrazoles.

EXAMPLE 8

A 111.5 mg. sample of 17α-tetrahydropyranyloxy-20-hydroxy-2-hydroxymethylene-4-pregnene-3 - one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo. The product is dissolved in methanol and then allowed to crystallize slowly to afford a product which is predomintnaly the 2'-(p-fluorophenyl)-17α-tetrahydropyranyloxy-20-hydroxy-4-pregneno-[3,2-c]pyrazole.

A mixture of 1'-(p-fluorophenyl)- and 2'-(p-fluorophenyl)-17α-tetarhydropyranyloxy - 20 - oxo - 4 - pregneno-[3,2-c]pyrazole is prepared by the following route: A mixture of 1 gram of 17α-tetrahydropyranyloxy-20-hydroxy-2-hydroxymethylene-4-pregnene-3-one, 200 ml. of methanol, and 200 mg. of p-toluenesulfonic acid is heated to reflux temperature for one hour. The reaction mixture is then diluted with water and extracted with ethyl acetate. The ethyl acetate extract is washed two times with 2 N aqueous sodium hydroxide soluion and then with water. The ethyl acetate extract is then dried and concentrated in vacuo. The 17α-tetrahydropyranyloxy-20-hydroxy-2-methoxymethylene-4-pregnene-3-one is obtained by chromatography on acid-washed alumina and elution with ether:chloroform mixtures.

A mixture of 500 mg. of the 2-methoxymethylene-derivative 100 ml. of ethanol, and 1 ml. of p-fluorophenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water.

The ethyl acetate extracts are then dried, concentrated, and chromotographed on acid-washed alumina to afford the 1'-(p-fluorophenyl) and 2'-(p-fluorophenyl) - 17α-tetrahydropyranyloxy-20 - hydroxy-4 - pregneno - [3,2-c]pyrazole.

In accordance with all of the above procedures, but starting with the 2-hydroxymethylene derivative which is obtained from each of the starting materials which are defined by Compound 16 of Flow Sheet B, there are obtained the corresponding 1'-(p-fluorophenyl- and 2'-(p-fluorophenyl)-derivatives.

EXAMPLE 9

The 17α - tetrahydropyranyloxy - 20 - hydroxy - 4-pregneno-[3,2-c]pyrazole (326.0 mg.) is dissolved in 32.6 ml. of purified acetone and cooled in an ice bath to 0–5° C. A chromium trioxide-sulfuric acid reagent (0.247 ml.), prepared by dissolving 26.72 g. of chromium trioxide in 23 cc. of concentrated sulfuric acid and then diluting with water to a volume of 100 cc., is added and the mixture is stirred for 40 seconds. Cold 0.1 N sodium hydroxide (20 ml.) is added, followed by 170 ml. of cold water. The mixture is stirred at room temperature for 10 minutes. The product is filtered, washed with water and air-dried for 10 minutes. It is then dissolved in 40 ml. of methanol and filtered. The solvent is removed in vacuo. The residue is then dissolved in 10 ml. of chloroform and the solution is dried over magnesium sulfate, filtered and the solvent removed on a steam bath. On drying 264.7 mg. of residue is obtained. The residue is chromatographed on silica gel. The fractions which have been eluted with 99% chloroform-1% methanol are collected and combined with chloroform. The solvent is removed to give 108.3 mg. of 17α - tetrahydropyranyloxy-20-oxo-4-pregneno[3,2-c]pyrazole $\lambda_{max}$ 260 m$\mu$, E% 177. The I.R. spectrum shows some 17 carbonyl to be present.

EXAMPLE 10

The 17α - tetrahydropyranyloxy - 20 - oxo-4-pregneno-[3,2-c]pyrazole (40.0 mg.) is dissolved in 0.5 ml. of methanol and treated with 1.82 ml. of a solution of 500 mg. of p-toluenesulfonic acid monohydrate in 25 ml. of methanol. The mixture is kept at room temperature for 4 hours. The solvent is removed on a steam bath and the residue is treated with 3 ml. of ethyl acetate. The insoluble material is filtered off and the mother liquor washed twice with 2 ml. of 10% sodium bicarbonate and twice with 2 ml. of water. The product is dried over magnesium sulfate, filtered and the solvent removed on a steam bath. The residue is slurried with a small amount of methylene chloride, and the slurry is filtered and dried in vacuo to give 23.0 mg. of a 17α - hydroxy-20-oxo-4-pregneno-[3,2-c]pyrazole U.V.

$\lambda_{max.}^{MeOH}$ 260 m$\mu$, $E\%$ 293

EXAMPLE 11

To a suspension of 25.0 g. of 17α,21-dihydroxy-16α-methyl-4-pregneno-3,20-dione in 1.5 liter of alcohol-free chloroform cooled to about 5° C. in an ice bath is added with constant stirring 750 ml. of cold, concentrated hydrochloric acid and then 750 ml. of Formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paperstrip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 17α,20,20,21 - bis(methylenedioxy) - 16α - methyl - 4 - pregnene-3-one which is used in the subsequent step of the synthesis without further purification.

The 17α,20,,20,21 - bis(methylenedioxy-16α-methyl-4-pregnene-3-one (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21-bis(methylenedioxy)-2-hydroxymethylene-16α-methyl-4-pregnene-3-one.

The 17α,20,20,21-bis(methylenedioxy)-2-hydroxymethylene-16α-methyl-4-pregnene-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaported to dryness under reduced pressure. The residue is washed three times with cold water and the resulting amorphous solid is dried at 80° C. for 1 hour in high vacuum to give 17α,20,20,21-bis(methylenedioxy)-16α-methyl-4-pregneno-[3,2-c] pyrazole.

The 17α,20,20,21 - bis(methylenedioxy) - 16-methyl-4-pregneno-[3,2-c]pyrazole (720 mg.) is heated in a steam bath with 24 ml. of a 60% aqueous solution of formic acid for about 30 minutes. The excess reagent is removed under vacuum using a water bath at about 50° C. as the source of heat. The residue is flushed four times with n-hexane and then dried at 60° C. in high vacuum to give an amorphous solid which is a mixture of 17α,21-dihydroxy - 16α-methyl-20-oxo-4-pregneno-[3,2-c]pyrazole and/or its formylated derivatives. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 17α,21-dihydroxy-16α-methyl-20-oxo-4-pregneno-[3,2-c]pyrazole.

To a solution of 100 mg. of 17α,21-dihydroxy-16α-methyl-20-oxo-4-pregneno-[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford the N-acetyl-17α,21-dihydroxy-16α-methyl - 20 - oxo-4-pregneno-[3,2-c]pyrazole 21-acetate which is isolated by the addition of water and filtration.

In accordance with the above procedure, but using an equivalent quantity of another acylating agent in place of acetic anhydride, there is obtained the corresponding N - acyl - 17α,21 - dihydroxy-16α-methyl-20-oxo-4-pregneno-[3,2c]pyrazole 21-acylate.

A solution of 5.73 g. of N-acetyl-17α,21-dihydroxy-16α-methyl-20-oxo-4-pregneno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness under vacuum. Recrystallization of the resulting product affords the 17α,21-dihydroxy-16α-methyl-20-oxo-4-pregneno-[3,2-c]pyrazole 21-acetate.

To a solution of 3.70 g. of 17α,21-dihydroxy-16α-methyl-20-oxo-4-pregneno [3,2-c]pyrazole (Example 11) in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl-pyrazole in sufficient purity for the next step.

To a solution of 85 mg. of N-carbamyl-17α,21-dihydroxy-16α - methyl-20-oxo-4-pregneno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl-17α,21-dihydroxy-16α-methyl-20-oxo-4-pregneno-[3,2-c]pyrazole 21-mesylate.

To a solution of 62 mg. of N-carbamyl-17α,21-dihydroxy-16α-methyl-20-oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl-17α,21-epoxy-16α-methyl-20-oxo-4-pregneno - [3,2 - c]pyrazole and N - carbamyl-21-fluoro-17α-hydroxy-16α-methyl-20-oxo-4-pregneno-[3,2-c]pyrazole, which compounds are separated by partition chromatography, or by chromatography on silica gel.

To a solution of 355 mg. of N-carbamyl-21-fluoro-17α - hydroxy - 16α - methyl - 20-oxo-4-pregneno-[3,2-c] pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 21-fluoro-17α-hydroxy-16α-methyl-20-oxo-4-pregneno-[3,2-c]pyrazole.

To 180 mg. of N-carbamyl-17α,21-dihydroxy-16α-methyl-20-oxo-4-pregneno-[3,2-c]pyrazole 21 - mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N - carbamyl-17α-hydroxy-21-iodo-16α - methyl-20-oxo-4-pregneno-[3,2-c]pyrozole.

The N - carbamyl-17α-hydroxy-21-iodo-16α-methyl-20-oxo-4-pregneno-[3,2-c]pyrazole is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the material which separates is recovered by filtration. The product is washed with water, dried and recrystallized from ethyl acetate to give N-carbamyl-17α-hydroxy-16α-methyl-20-oxo-4-pregneno-[3,2-c]pyrazole.

To a solution of 355 mg. of N-carbamyl-17α-hydroxy-20-oxo-4-pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 17α-hydroxy-20-oxo-4-pregneno-[3,2-c]pyrazole.

In accordance with the above procedures but starting with any of the starting materials defined by Compound 1 of Flow Sheet A, there are obtained the corresponding 17α-hydroxy-20-oxo-4-pregneno- (and 4,6-pregnadieno)-[3,2-c]pyrazole and the 21-fluoro-, 21-hydroxy-, 21-acyloxy- and N-acyl-derivatives thereof.

For example, starting with the 17α,21-dihydroxy-4-pregnene - 3,20 - dione, the 17α,21 - dihydroxy-20-oxo-4-pregneno-[3,2-c]pyrazole and its N-acyl and 21-acyl derivatives are obtained; starting with the 17α,21-dihydroxy-6,16α-dimethyl-4,6-pregnadiene - 3,20 - dione, the 17α,21-dihydroxy-6,16α-dimethyl-20-oxo - 4,6 - pregnadieno-[3,2-c]pyrazole and its N-acyl and 21-acyl derivative are obtained. Starting with the 17α,21-dihydroxy-4,6-pregnadiene-3,20-dione the 17α-hydroxy- and the 17α,21-dihydroxy-20-oxo-4,6-pregnadieno - [3,2-c]pyrazole and the N-acyl derivatives thereof are obtained.

The above named 21-hydroxy-compounds are converted into the 21-phosphates following the procedure of Example 15.

EXAMPLE 12

To a solution of 0.5 millimole of 17α,20,20,21 - bis(methylenedioxy) - 2 - hydroxymethylene - 16α - methyl-4-pregnene-3-one (Example 11) in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the 17α,20,20,21 - bis(methylenedioxy)-1',16α - dimethyl - 4 - pregneno - [3,2-c]pyrazole which is formed as the major component is removed by filtration.

Alternately, a mixture of 1'6α - dimethyl -, and 2',16α - dimethyl - 17α,20,20,21 - bis(methylenedioxy)-4 - pregneno - [3,2 - c]pyrazole is prepared by heating 17α,20,20,21 - bis(methylenedioxy) - 2 - hydroxymethylene - 16α - methyl - 4 - pregnene - 3 - one with methanol in the presence of p-toluenesulfonic acid to form the 17α,20,20,21 - bis(methylenedioxy) - 2 - methoxymethylene - 16α - methyl - 4 - pregnene - 3 - one, and then reacting the latter compound with methylhydrazine, following the detailed procedures given in column —, but using methylhydrazine instead of phenylhydrazine in the second step of the reaction. The components of the mixture are separated by chromatography.

In accordance with the above procedures, but using other alkyl substituted hydrazines such as ethyl-, β-hydroxyethyl-, propyl-, butyl-hydrazines, and the like, in place of methyl-hydrazine, there are obtained the corresponding 1' - alkyl- and 2' - alkyl - 17α,20,20,21 - bis(methylenedioxy) - 16α - methyl - 4 - pregneno - [3,2-c] pyrazoles.

The 17α,20,20,21 - bis(methylenedioxy) - N,16α - dimethyl - 4 - pregneno - [3,2-c]pyrazoles may be prepared also by the following procedure:

The 17α,20,20,21 - bis(methylenedioxy) - 2 - hydroxymethylene - 16α - methyl - 4 - pregnene - 3 - one is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for one hour in high vacuum to give 17α,20,20,21-bis(methylenedioxy)-16α-methyl-4-pregneno-[3,2-c]pyrazole.

A solution of about 0.47 millimole of 17α,20,20,21-bis(methylenedioxy) - 16α - methyl - 4 - pregneno-[3,2-c]pyrazole in 10 ml. of benzene is treated with about 30–38 mg. of about 51% sodium hydride (in oil suspension). After the addition of 2–3 ml. of dimethylformamide (dried over calcium hydride) and 5 ml. of methyl iodide, the mixture is stirred at room temperature overnight. The product is filtered, washed with methylene chloride, and the filtrate and washings are taken to dryness. The residue is treated with water and the product is filtered to afford as a major component the 17α,20,20,21-bis(methylenedioxy)-N,16α-dimethyl-4-pregneno-[3,2-c]pyrazole In accordance with the above procedure, but using another alkylating agent, for example, ethyl iodide, propyl iodide and the like, in place of the methyl iodide, there is obtained the corresponding N-alkyl-17α,20,20,21-bis (methylenedioxy) - 16α - methyl - 4 - pregneno-[3,2-c] pyrazole.

The 17α,20,20,21 - bis(methylenedioxy) - 2',16α - dimethyl - 4 - pregneno-[3,2-c]pyrazole (15 mg.) is heated on a steam bath with 1 ml. of 60% formic acid for about 20 minutes and then filtered hot. The filtrate is taken to dryness, water is added, and a mixture of the 17α,21 - dihydroxy - 2',16α - dimethyl - 20 - oxo - 4-pregneno-[3,2-c]pyrazole and its 21-formate is recovered by filtration. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 17α,21 - dihydroxy - 2',16α-dimethyl - 20 - oxo - 4 - pregneno-[3,2-c]pyrazole.

To a solution of 100 mg. of 17α,21-dihydroxy-2',16α-dimethyl - 20 - oxo - 4 - pregneno - [3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The 17α,21-dihydroxy-2',16α-dimethyl- 20 - oxo - 4 - pregneno - [3,2-c]pyrazole 21 - acetate is then isolated by addition of water and filtration.

In accordance with the above procedure, but using an equivalent quantity of another acylating agent in place of acetic anhydride, there is obtained the corresponding 17α,21 - dihydroxy - 2',16α - dimethyl - 20 - oxo - 4-pregneno-[3,2-c]pyrazole 21-acylate.

To a solution of 85 mg. of 17α,21-dihydroxy-2',16α-dimethyl-20-oxo-4-pregneno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give 17α,21 - dihydroxy - 2',16α - dimethyl - 20 oxo-4-pregneno-[3,2-c]pyrazole 21-mesylate.

To 180 mg. of 17α,21 - dihydroxy - 2',16α - dimethyl-20 - oxo - 4 - pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give 17α-hydroxy - 21 - iodo - 2',16α - dimethyl - 20 - oxo - 4-pregneno-[3,2-c]pyrazole.

The 17α - hydroxy - 21 - iodo - 2',16α - dimethyl - 20-oxo - 4 - pregneno - [3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give 17α-hydroxy-2', 16α - dimethyl - 20 - oxo - 4 - pregneno-[3,2-c]pyrazole.

To a solution of 62 mg. of 17α,21-dihydroxy-2',16α-dimethyl-20-oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21 - epoxy - 2',16α - dimethyl-20-oxo-4-pregneno-[3,2-c]pyrazole and 21 - fluoro - 17α - hydroxy - 2',16α-dimethyl - 20 - oxo - 4 - pregneno-[3,2-c] pyrazole, which compounds are separated by partition chromatography, or by chromatography on silica gel.

In accordance with the above procedures beginning with the 2' - methyl - 17α,20,20,21-bis(methylenedioxy)-4 - pregneno - [3,2-c]pyrazole, but using the 1'-methyl-derivative in place of the 2'-methyl-derivative, there are obtained the corresponding 1'-methyl compounds.

In accordance with all of the above procedures, but starting with a 17α,20,20,21 - bis(methylenedioxy) - 2-hydroxymethylene - 4 - pregnene - (or 4,6 - pregnadiene)-3-one which is obtained from each of the starting materials defined by Compound 3 of Flow Sheet A, there are obtained the corresponding 1'-methyl- and 2'-methyl derivative.

EXAMPLE 13

A mixture of 90 mg. of 17α,20,20,21 - bis(methylenedioxy) - 2 - hydroxymethylene - 16α - methyl-4-pregnene-3-one (Example 11) and 0.028 ml. of phenylhydrazine are refluxed under nitrogen in 1.2 ml. of absolute ethanol for 50 minutes. The reaction mixture is taken to dryness. Water is added and the product is filtered to give an amorphous solid, which is washed successively with water, dilute acid, water, and petroleum ether. The product is crystallized from methanol to give 17α,20,20,21-bis (methylenedioxy) - 16α - methyl - 2' - phenyl-4-pregneno-[3,2-c]pyrazone.

Alternately, a mixture of the 1' - phenyl- and 2'-phenyl - 17α,20,20,21 - bis(methylenedioxy)16α-methyl-4-pregneno-[3,2-c]pyrazole is prepared by the following route: A mixture of 1 gram of 17α,20,20,21 - bis(methylenedioxy( - 2 - hydroxymethylene - 16α - methyl-4 - pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 17α, 20,20,21 - bis(methylenedioxy) - 2 - methoxymethylene-16α-methyl-4-pregnene-3-one is obtained by direct crystallization or by chromatography on acid-washed alumina and elution with ether: chloroform mixtures.

A mixture of 500 mg. of 17α,20,20,21 - bis(methylenedioxy) - 2 - methoxymethylene - 16α - methyl-4-pregnene-3-one, 100 ml. of ethanol, and 1 ml. of phenylhydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α, 20,20,21 - bis(methylenedioxy) - 16α - methyl - 1′-phenyl - 4 - pregneno - [3,2-c]pyrazole. Further elution with a mixture of 1:1 ether: petroleum ether and crystallization from benzene, affords the 17α,20,20,21 - bis (methylenedioxy) - 16α - methyl - 2′ - phenyl-4-pregneno-[3,2-c]pyrazole.

A 30 mg. aliquot of 17α,20,20,21-bis(methylenedioxy)-16α - methyl-2′-phenyl-4-pregneno - [3,2-c]pyrazole is heated on a steam bath with 2 ml. of 60% formic acid for 35 minutes. The solvents are removed under vacuum, water is added and the product is filtered off to give a mixture of 17α,21-dihydroxy-16α-methyl-20-oxo-2′-phenyl-4-pregneno-[3,2-c]pyrazole and its 21-formate. The presence of formate is indicated by infrared absorption at 5.81 and 8.5μ.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for 10 minutes. The alkoxide is neutralized with acetic acid and the mixture is then taken to dryness and flushed with n-hexane. The residue is washed with water, filtered and dried to constant weight to give 17α,21 - dihydroxy - 16α-methyl - 20 - oxo - 2′ - phenyl-4-pregneno-[3,2-c]pyrazole.

The 17α,21 - dihydroxy - 16α - methyl - 20 - oxo-2′-phenyl - 4-pregneno-[3,2-c]pyrazole is treated with a mixture of 1.5 ml. of pyridine and 1.5 ml. of acetic anhydride and the mixture is allowed to stand at room temperature over night. The solvents are removed under vacuum, water is added and the 17α,21-dihydroxy-16α-methyl - 20-oxo-2′-phenyl-4-pregneno - [3,2-c]pyrazole 21-acetate is removed by filtration. After drying, the compound is dissolved in methylene chloride, a few drops of 2.5 N HCl are added and the mixture is taken to dryness. The resulting 17α,21-dihydroxy-16α-methyl-20 - oxo-2′ - phenyl - 4-pregneno-[3,2-c]pyrazole 21-acetate hydrochloride salt is soluble in methylene chloride and can be crystallized from acetone.

The 17α,21 - dihydroxy - 16α - methyl - 20 -oxo-2′ - phenyl - 4-pregneno - [3-2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the 17α,21 - dihydroxy - 16α - methyl - 20-oxo - 2′ - phenyl-4 - pregneno - [3,2-c]pyrazole 21-mesylate.

The 17α,21 - dihydroxy - 16α - methyl - 20 - oxo-2′ - phenyl - 4 - pregneno-[3,2-c]pyrazole 21 - mesylate (180 mg.) is suspended in 10 ml. of acetone and 300 mg. of sodium iodide is added. The mixture is refluxed under nitrogen for about one hour. It is then cooled on ice. On the addition of water there is formed a white precipitate which is filtered off, washed with water, and dried under vacuum to give the 17α-hydroxy-21-iodo-16α-methyl - 20 - oxo - 2′ - phenyl - 4 - pregneno[3,2-c]pyrazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silicia gel. The 17α - hydroxy-16α-methyl-20-oxo-2′-phenyl - 4-pregneno - [3,2-c]pyrazole so obtained is crystallized from a mixture of acetone and ether.

In accordance with all of the above procedures, but starting with the 17α,20,20,21-bis(methylenedioxy) - 2-hydroxymethlene-4-pregenene derivative which is obtained from each of the starting materials defined by Compound 3 of Flow Sheet A, there are obtained the corresponding 1′-phenyl- and 2′-phenyl-derivatives.

For example, starting with the 17α,20,20,21-bis(methylenedioxy) - 2 - hydroxymethylene - 4 - pregene-3-one (which is prepared from 17α,21-dihydroxy-4-pregnene-3,20-dione following the first two procedures of Example 11) there are obtained 17α,21-dihydroxy-20-oxo-2′-phenyl-4-pregneno[3,2-c]pyrazole and the N-acyl and 21-acylates thereof; 17α-hydroxy-20-oxo-2′-phenyl-4-pregneno-[3,2-c]pyrazole and the 21-fluoro-17α-hydroxy-20-oxo-2′-phenyl-4-pregneno-[3,2-c]pyrazole.

Starting with the 17α,20,20,21-bis(methylenedioxy)-2-hydroxymethylene - 16β - methyl-4 - pregnene-3 - one (which is prepared from 17α,21-dihydroxy-16β-methyl-4-pregnene-3,20-dione following the first two procedures of Example 11) there are obtained the 17α,21-dihydroxy-16β-methyl - 20 - oxo - 2′ - phenyl - 4 - pregneno-[3,2-c]pyrazole and the N-acyl and 21-acylates thereof; the 17α - hydroxy - 16β - methyl - 20 - oxo - 2′-phenyl-4 - pregneno - [3,2-c]pyrazole and the 21-fluoro-17α-hydroxy - 16β - methyl - 20 - oxo - 2′ - phenyl - 4-pregneno-[3,2-c]pyrazole.

Starting with the 17α,20,20,21-bis(methylenedioxy)-2 - hydroxymethylene - 6α,16α-dimethyl - 4 - pregnene-3-one (which is prepared from 17α,21-dihydroxy-6α,16α-dimethyl-4-pregnene-3,20-dione following the first two procedures of Example 11) there are obtained the 17α,21-dihydroxy - 6α,16α - dimethyl - 20 - oxo - 2′ - phenyl-4-pregneno-[3,2-c]pyrazole and the N-acyl and 21-acylates thereof; the 17α-hydroxy-6α,16α-dimethyl-20-oxo-2′-phenyl - 4 - pregneno - [3,2-c]pyrazole and the 21-fluoro-17α - hydroxy - 6α,16α - dimethyl - 20-oxo-2′-phenyl-4-pregneno-[3,2-c]pyrazole.

Starting with the 16α-fluoro-17α,20,20,21-bis(methylenedioxy) - 2 - hydroxymethylene - 4 - pregnene - 3-one (which is prepared from the 16α-fluoro-17α,21-dihydroxy-4-pregnene-3,20-dione following the first two procedures of Example 11) there are obtained the 16α-fluoro - 17α, 21 - dihydroxy - 20 - oxo - 2′ - phenyl - 4-pregnene-[3,2-α]pyrazole and the N-acyl and 21-acylates thereof; the 16α - fluoro - 17α - hydroxy - 20 - oxo - 2′-phenyl-4-pregneno-[3,2-c]pyrazole and the 16α,21-difluoro - 17α - hydroxy - 20 - oxo - 2′ - phenyl - 4 - pregneno-[3,2-c]pyrazole.

Starting with the 17α,20,20,21-bis(methylenedioxy)-6,16α - dimethyl - 2 - hydroxymethylene - 4,6 - pregnadiene-3-one (which is prepared from the 17α,21-dihydroxy - 6,16α - diemthyl - 4,6 - pregnadiene - 3,20-dione following the first two procedures of Example 11) there are obtained the 17α,21-dihydroxy-6,16α-dimethyl-20 - oxo - 2′ - phenyl - 4,6 - pregnadieno - [3,2 - c] pyrazole and the N-acyl and 21- acylates thereof; the 17α - hydroxy - 6,16α - dimethyl - 20 - oxo - 2′ - phenyl-4,6 - pregnadieno - [3,2 - c]pyrazole and the 21 - fluoro-17α - hydroxy - 6,16α - dimethyl - 20 - oxo - 2′ - phenyl-4,6-pregnadieno-[3,2-c]pyrazole.

Starting with the 6-fluoro-17α,20,20,21-bis(methylenedioxy) - 2 - hydroxymethylene - 16α - methyl - 4,6 - pregnadiene-3-one (which is prepared from 6-fluoro-17α,21-dihydroxy - 16α - methyl - 4,6 - pregnadiene - 3,20 - dione following the first two procedures of Example 11)

there are obtained the 6-fluoro-17α, 21-dihydroxy-16α-methyl - 20 - oxo - 2' - phenyl - 4,6 - pregnadieno - [3,2-c]pyrazole and the N-acyl and 21-acylates thereof; the 6 - fluoro - 17α - hydroxy - 16α - methyl - 20 - oxo - 2'-phenyl - 4,6 - pregnadieno [3,2 - c] pyrazole and the 6,21 - difluoro - 17α - hydroxy - 16α - methyl - 20 - oxo-2'-phenyl-4,6-pregnadieno-[3,2-c]pyrazole.

Starting with the 16α-fluoro-17α,20,20,21-bis(methylenedioxy)-2-hydroxymethylene-6-methyl-4,6-pregnadiene-3-one (which is prepared from the 16α-fluoro-17α,21-dihydroxy - 6 - methyl - 4,6 - pregnadiene - 3,20 - dione following the first two procedures of Example 11) there are obtained the 16α-fluoro-17α,21-dihydroxy-6-methyl-20 - oxo - 2' - phenyl - 4,6 - pregnadieno - [3,2 - c] pyrazole and the N-acyl and 21-acylates thereof; the 16α-fluoro - 17α - hydroxy - 6 - methyl - 20 - oxo - 2'-phenyl - 4,6 - pregnadieno - [3,2 - c]pyrazole and the 16α,21 - difluoro - 17α - hydroxy - 6 - methyl - 20 - oxo-2' - phenyl - 4,6 - pregnadieno - [3,2 - c]pyrazole.

Starting with the 6,16α - difluoro - 17α,20,20,21 - bis (methylenedioxy) - 2 - hydroxymethylene - 4,6 - pregnadiene-3-one (which is prepared from the 6,16α-difluoro - 17α,21 - dihydroxy - 4,6 - pregnadiene - 3,20-dione following the first two procedures of Example 11) there are obtained the 6,16α-difluoro-17α,21-dihydroxy-20 - oxo - 2' - phenyl - 4,6 - pregnadieno - [3,2 - c] pyrazole and the N-acyl and 21-acylates thereof; the 6,16α - difluoro - 17α - hydroxy - 20 - oxo - 2' - phenyl-4,6 - pregnadieno - [3,2 - c]pyrazole and the 6,16α,21-trifluoro - 17α - hydroxy - 20 - oxo - 2' - phenyl - 4,6-pregnadieno-[3,2-c]pyrazole.

All of the above named 21-hydroxy compounds are converted into the 21 phosphates following the procedure of Example 15.

EXAMPLE 14

A 111.5 mg. sample of 17α,20,20,21-bis(methylenedioxy) - 2 - hydroxymethylene - 16α - methyl - 4 - pregnene-3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum to give a residue which has as its major component the 17α,20,20,21 - bis(methylenedioxy) - 2' - (p - fluorophenyl) - 16α - methyl - 4 - pregneno - [3,2 - c]pyrazole. The latter compound is recovered by dissolving the reaction mixture in methanol and then recrystallizing.

Alternately, a mixture of the 1'-(p-fluorophenyl)- and the 2' - (p - fluorophenyl) - 17α,20,20,21 - bis(methylenedioxy) - 16α - methyl - 4 - pregneno - [3,2 - c] pyrazole is prepared by the following route: A mixture of 1 gram of 17α,20,20,21-bis (methylenedioxy)-2-hydroxy - methylene - 16α - methyl - 4 - pregnene - 3 - one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 17α,20,20,21-bis(methylenedioxy) - 2 - methyloxymethylene - 16α methyl-4-pregnene-3-one is obtained by direct crystallization or by chromatography on acid-washed alumina and elution with ether:chloroform mixtures.

A mixture of 500 mg. of 17α,20,20,21-bis(methylenedioxy) - 2 - methoxymethylene - 16α - methyl - 4 - pregnene-3-one, 100 ml. of ethanol, and 1 ml. of p-fluorophenylhydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water.

The ethyl acetate extract is then dried, concentrated, and chromatographed on acid-washed alumina. Elution with benzene affords a product which on recrystallization from a mixture of benzene and ethyl acetate affords the 17α,20,20,21-bis(methylenedioxy)-16α-methyl - 1' - fluorophenyl-4-pregneno-[3,2-c]pyrazole. Further elution with a mixture of 1:1 ether: petroleum ether, and crystallization from benzene, affords the 17α,20,20,21-bis(methylenedioxy)-16α-methyl-2'-(p-fluorophenyl) - 4 - pregneno-[3,2-c]pyrazole.

A 70 mg. aliquot of 17α,20,20,21-bis(methylenedioxy)-2'-(p-fluorophenyl) - 16α - methyl - 4 - pregneno-[3,2-c]-pyrazole is heated on a steam bath with 2 ml. of a 60% solution of formic acid for 35 minutes. The excess reagent is removed under vacuum using a water bath at about 50° C. The residue is thoroughly washed with water and then dried at 80° C. to give 61.1 mg. of residue. The crude product is dissolved in 3 ml. of spectral grade methanol and allowed to react with 0.5 ml. of a 0.1 N solution of sodium methoxide in methanol at room temperature for 10 minutes. The product is neutralized with acetic acid. The mixture is then taken to dryness and washed thoroughly with water, filtered and dried to constant weight to give 17α,21-dihydroxy-2'-(p-fluorophenyl)-16α-methyl-20-oxo-4-pregneno-[3,2-c]pyrazole.

To a solution of 100 mg. of 17α,21-dihydroxy-2'-(p-fluorophenyl)-16α-methyl - 20 - oxo-4-pregneno-[3,2-c]-pyrazole in 2 ml. of pyridine is added one milliequivalent of acetic anhydride. The mixture is allowed to stand over night at room temperature. A mixture of ice and water is then added. After standing for about 30 minutes, the product is extracted with ethyl acetate. The ethyl acetate is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford 17α,21-dihydroxy-2'-(p-fluorophenyl)-16α-methyl - 20 - oxo-4-pregneno-[3,2-c]pyrazole 21-acetate which is isolated by the addition of water and filtration. After drying, the compound is dissolved in methylene chloride, a few drops of 2.5 N HCl are added and the mixture is taken to dryness. The resulting hydrochloride salt is crystallized from acetone.

In accordance with the above procedure, but using an equivalent quantity of another acylating agent in place of acetic anhydride, there is obtained the corresponding 21-acylate.

To a solution of 85 mg. of 2'-(p-fluorophenyl)-17α,21-dihydroxy-16α-methyl - 20 - oxo-4-pregneno-[3,2-c]pyrazole in 0.5 ml. of pyridine, cooled to 0° C., is added 0.015 ml. of methanesulfonyl chloride. The resulting mixture is allowed to stand at a temperature of approximately 0° C. for a period of approximately 1 hour. Water is then added to the reaction mixture and the crystalline precipitate which forms is recovered by filtration, washed with water, and dried to give 2'-(p-fluorophenyl)-17α,21-dihydroxy-16α-methyl - 20 - oxo-4-pregneno-[3,2-c]-pyrazole 21-mesylate.

To 180 ml. of 2'-(p-fluorophenyl)-17α,21-dihydroxy-16α-methyl-20-oxo-4-pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered by filtration, washed with water, and dried to give 2'-(p-fluorophenyl)-17α-hydroxy-21-iodo-16α-methyl-20-oxo-4-pregneno-[3,2-c]pyrazole.

The 2'-(p-fluorophenyl)-17α-hydroxy - 21 - iodo-16α-methyl-20-oxo-4-pregneno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the crystalline material which separates is recovered by filtration. The product is washed with water, dried and recrystallized from ethyl acetate to give 2'-(p-fluorophenyl)-17α-hydroxy - 16α - methyl-20-oxo-4-pregneno-[3,2-c]pyrazole.

To a solution of 62 mg. of 2'-(p-fluorophenyl)-17α, 21-dihydroxy-16α-methyl - 20 - oxo-4-pregneno-[3,2-c]-pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 2'-(p-fluorophenyl)-17α,21-epoxy-16α-methyl - 20 - oxo-4-pregneno-[3,2-c]pyrazole and 2'-(p-fluorophenyl)-21-fluoro-17α-hydroxy-16α-methyl - 20 - oxo-4-pregneno-[3,2-c]pyrazole which compounds are separated by partition chromatography.

In accordance with the above procedures beginning with the 2' - (p - fluorophenyl) - 17α,20,20,21 - bis(methylenedioxy) - 6α - methyl - 4 - pregneno - [3,2-c]pyrazole, but using the 1' - (p - fluorophenyl) - derivatives in place of the 2' - (p - fluorophenyl) - derivative, there are obtained the corresponding 1' - (p - fluorophenyl) - compounds.

In accordance with all of the above procedures, but starting with the 17α,20,20,21 - bis(methylenedioxy)-2-hydroxymethylene - 4 - pregnene - derivative which is obtained from each of the starting materials defined by Compound 2 of Flow Sheet A, there are obtained the corresponding 1' - (p - fluorophenyl)- and 2' - (p-fluorophenyl)-derivatives.

For example, starting with the 17α,20,20,21-bis(methylenedioxy) - 2 - hydroxymethylene - 4 - pregnene - 3-one (which is prepared from 17α,21-dihydroxy-4-pregnene-3,20-dione following the first two procedures of Example 11) there are obtained 17α,21-dihydroxy-20-oxo-2' - (p - fluorophenyl) - 4 - pregneno - [3,2-c]pyrazole and the N-acyl and 21-acylates thereof; 17α-hydroxy-20-oxo - 2' - (p - fluorophenyl) - 4 - pregneno - [3,2-c]pyrazole and the 21 - fluoro - 17α - hydroxy - 20 - oxo - 2'-(p-fluorophenyl)-4-pregneno-[3,2-c]pyrazole.

Starting with the 17α,20,20,21 - bis(methylenedioxy)-2 - hydroxymethylene - 16β - methyl - 4 - pregnene-3-one (which is prepared from 17α,21-dihydroxy-16β-methyl-4-pregnene-3,20-dione following the first two procedures of Example 11) there are obtained the 17α,21-dihydroxy-16β - methyl - 20 - oxo - 2' - (p-fluorophenyl)-4-pregneno - [3,2-c]pyrazole and the N-acyl and 21-acylates thereof; the 17α - hydroxy - 16β - methyl - 20 - oxo-2'-(p - fluorophenyl) - 4 - pregneno - [3,2-c]pyrazole and the 21 - fluoro - 17α - hydroxy - 16β - methyl - 20 - oxo-2' - (p - fluorophenyl) - 4 - pregneno - [3,2-c]pyrazole.

Starting with the 17α,20,20,21-bis(methylenedioxy)-2-hydroxymethylene - 6α,16α - dimethyl - 4 - pregnene-3-one (which is prepared from 17α,21 - dihydroxy-6α,16α-dimethyl-4-pregnene-3,20-dione following the first two procedures of Example 11) there are obtained the 17α,21-dihydroxy - 6α,16α - dimethyl - 20 - oxo - 2' - (p - fluorophenyl) - 4 - pregneno - [3,2-c]pyrazole and the N-acyl and 21 - acylates thereof; the 17α - hydroxy - 6α,16α-dimethyl - 20 - oxo - 2' - (p-fluorophenyl)-4-pregneno-[3,2-c]pyrazole and the 21 fluoro - 17α - hydroxy - 6α,16α - dimethyl - 20 - oxo - 2' - (p - fluorophenyl) - 4-pregneno - [3,2-c]pyrazole.

Starting with the 17α,20,20,21 - bis(methylenedioxy)-16α - fluoro - 2 - hydroxymethylene - 4 - pregnene-3-one (which is prepared from the 16α - fluoro - 17α,21-dihydroxy - 4 - pregnene - 3,20 - dione following the first two procedures of Example 11) there are obtained the 16α-fluoro - 17α,21 - dihydroxy - 20 - oxo - 2' - (p-fluorophenyl) - 4 - pregneno - [3,2-c]pyrazole and the N-acyl and 21 - acylates thereof; the 16α - fluoro - 17α - hydroxy-20 - oxo - 2' - (p-fluorophenyl)-4-pregneno-[3,2-c]pyrazole and the 16α,21 - difluoro - 17α - hydroxy - 20 - oxo-2' - (p - fluorophenyl) - 4 - pregneno - [3,2-c]pyrazole.

Starting with the 17α,20,20,21 - bis(methylenedioxy)-6,16α - dimethyl - 2 - hydroxymethylene - 4,6 - pregnadiene-3-one (which is prepared from the 17α,21-dihydroxy - 6,16α - dimethyl - 4,6 - pregnadiene - 3,20 - dione following the first two procedures of Example 11) there are obtained the 17α,21 - dihydroxy - 6,16α - dimethyl-20 - oxo - 2' - (p - fluorophenyl) - 4,6 - pregnadieno-[3,2-c]pyrazole and the N-acyl and 21-acylates thereof; the 17α - hydroxy - 6,16α - dimethyl - 20 - oxo - 2'-(p-fluorophenyl) - 4,6 - pregnadieno - [3,2-c]pyrazole and the 21-fluoro - 17α - hydroxy - 6,16α - dimethyl - 20 - oxo - 2'-(p - fluorophenyl) - 4,6 - pregnadieno - [3,2-c]pyrazole.

Starting with the 6 - fluoro - 17α,20,20,21-bis(methylenedioxy) - 2 - hydroxymethylene - 16α - methyl - 4,6-pregnadiene-3-one (which is prepared from 6-fluoro-17α, 21 - dihydroxy - 16α - methyl - 4,6 - pregnadiene-3,20-dione following the first two procedures of Example 11) there are obtained the 6-fluoro-17α,21-dihydroxy-16α-methyl - 20 - oxo - 2' - (p - fluorophenyl) - 4,6 - pregnadieno - [3,2-c]pyrazole and the N-acyl and 21-acylates thereof; the 6 - fluoro - 17α - hydroxy - 16α - methyl - 20-oxo - 2' - (p - fluorophenyl) - 4,6 - pregnadieno - [3,2-c]pyrazole and the 6,21 - difluoro - 17α - hydroxy - 16α-methyl - 20 - oxo - 2' - (p - fluorophenyl) - 4,6 - pregnadieno - [3,2-c]pyrazole.

Starting with the 16α - fluoro - 17α,20,20,21 - bis(methylenedioxy) - 2 - hydroxymethylene - 6 - methyl - 4,6-pregnadieno-3-one (which is prepared from the 16α-fluoro - 17α,21 - dihydroxy - 6 - methyl - 4,6-pregnadiene-3,20 - dione following the first two procedures of Example 11) there are obtained the 16α - fluoro - 17α,21-dihydroxy - 6 - methyl - 20 - oxo - 2' - (p - fluorophenyl)-4,6-pregnadieno - [3,2-c]pyrazole and the N-acyl and 21-acylates thereof; the 16α - fluoro - 17α - hydroxy - 6 - methyl-20 - oxo - 2' - (p - fluorophenyl-4,6-pregnadieno-[3,2-c] pyrazole and the 16α,21 - difluoro - 17α - hydroxy - 6-methyl - 20 - oxo - 2' - (p - fluorophenyl) - 4,6-pregnadieno - [3,2-c]pyrazole.

Starting with the 6,16α - difluoro - 17α,20,20,21-bis methylenedioxy) - 2 - hydroxymethylene - 4,6 - pregnadiene - 3 - one (which is prepared from the 6,16α-difluoro - 17α,21 - dihydroxy - 4,6 - pregnadiene-3,20-dione following the first two procedures of Example 11) there are obtained the 6,16α - difluoro - 17α,21 - dihydroxy-20-oxo - 2' - (p - fluorophenyl) - 4,6 - pregnadieno - [3,2-c] pyrazole and the N-acyl and 21 - acylates thereof; the 6,16α - difluoro - 17α - hydroxy - 20 - oxo - 2' - (p-fluorophenyl) - 4,6 - pregnadieno - [3,2-c]pyrazole and the 6,16α,21 - trifluoro - 17α - hydroxy - 20 - oxo - 2' - (p-fluorophenyl) - 4,6 - pregnadieno - [3,2-c]pyrazole.

All of the above named 21-hydroxy-compounds are converted into the 21-phosphates following the procedure of Example 15.

EXAMPLE 15

The following procedure particularly describes the preparation of the 21-phosphate from the 21-iodo-17α-hydroxy - 16α-methyl-20-oxo-2'-phenyl-4-pregneno-[3,2-c] pyrazole, but is generally applicable to all 21-iodo-17α-hydroxy-20-oxo-4-pregneno- (and 4,6-pregnadieno) pyrazoles defined by Compounds 7A and 7B of Flow Sheet A.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 17α-hydroxy-21 - iodo-16α-methyl-20-oxo-2'-phenyl-4-pregneno-[3,2-c] pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under a vacuum at a temperature below 25° C. The pH of the resulting aqueout suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give 17α-hydroxy-16α-methyl-20-oxo-2'-phenyl - 4-pregneno-[3,2-c]pyrazole-21-dihydrogen phosphate.

The mono- and the dialkali metal salts of the 21-dihydrogen phosphate compound are obtained by neutralizing the 21-dihydrogen phosphate ester with an alkali metal methoxide.

EXAMPLE 16

The following procedures are employed to prepare the 16α-fluoro-steroids used as starting materials in Flow Sheets A and B:

A solution of 9.0 g. of progesterone is prepared in 125 ml. of anhydrous t-butanol. To it is added with stirring 13.6 ml. of diethyl oxalate and 25 ml. of 2.5 N sodium methoxide in methanol at about 50° C. This mixture is stirred under nitrogen at room temperature over night. Then 3.06 g. of sodium acetate and 3.53 ml. of glacial acetic acid in 200 ml. of methanol are added. This solution is cooled in an ice bath and 10.8 g. of bromine in 110 ml. of methanol is added slowly over a half hour period. Then 57 ml. of 2.5 N methanolic sodium methoxide is added and the soluton is stirred for five hours at room temperature. The mixture is then poured into water and the precipitate is filtered off and dried. Five grams of this material is dissolved in 100 ml. of benzene, 50 ml. of methanol and 10 ml. of glacial acetic acid. Five grams of zinc dust is added and the reaction mixture is stirred vigorously for four hours. The solids are filtered off and washed with ethyl acetate. The combined organic layer is extracted with dilute sodium bicarbonate and dried. Chromatography on silica gel affords methyl-3-oxo-4,17(20)-pregnadiene-21-oate.

Two grams of the above product, 0.120 g. of 2,4-dinitrobenzenesulfonic acid, 60 ml. of dry dioxane and 4 ml. of freshly distilled ethyl orthoformate are stirred at 25° C. for three hours. The acid catalyst is then neutralized by addition of 2 ml. of pyridine. The reaction mixture is diluted with water and extracted with ether. The combined ether extracts are washed with water, dried, and evaporated under reduced pressure. The residue is chromatographed over alumina (alkine) and eluted with mixtures of ether and petroleum ether to separate the 3 enol ethyl ether of methyl 3-oxo-4,17(20)pregnadiene-21-oate.

Two hundred and fifty milligrams of the 3-enol ethyl ether of methyl 3-oxo-4,17,(20)-pregnadiene 21-oate is dissolved in 5 ml. of dry pyridine. This mixture is cooled to −20° C. and perchloryl fluoride is bubbled through slowly for three minutes. It is then poured into ice and water and extracted several times with ethyl acetate. The organic layer is washed first with dilute hydrochloric acid and then with 5% sodium bicarbonate, and then dried. The residue, after removal of solvent, is a mixture of the 6α and 6β-fluoro-isomers and is used in the next step without purification.

Three hundred and eighty-five milligrams of the crude 3-enol ethyl ether of methyl 3-oxo-4,17(20)-pregnadiene-21-oate is dissolved in 10 ml. of acetone containing 0.17 g. of sodium acetate dissolved in 1.7 ml. of water and the mixture is cooled to 0° C. N-chlorosuccinimide (170 mg.) is added, immediately followed by 0.17 ml. of glacial acetic acid. The reaction mixture is stirred in the ice bath for one and one-half hours and is then poured into ice water and extracted into ethyl acetate. Removal of the dried solvent leaves a residue containing methyl-6α-chloro-3-keto-4,17 (20)-pregnadiene-21-oate which is used directly in the next step.

Two hundred milligrams of the crude methyl-6-fluoro-3-keto-4,17(20)pregnadiene-21-oate are refluxed in a Dean-Stark water separator in 10 ml. of benzene with 0.5 ml. of pyrrolidine and 50 mg. of p-toluenesulfonic acid. After twenty-four hours, the cooled reaction mixture is extracted rapidly once with water, dried and taken to dryness. The residue is redissolved in 10 ml. of tetrahydrofuran, 200 mg. of lithium aluminum hydride are added and the mixture is refluxed for two hours. Water is cautiously added to the cooled reaction mixture, followed by ethyl acetate. The organic layer is separated and taken to dryness. The residue is refluxed for four hours with 0.75 g. of sodium acetate, 1 ml. of water, 0.4 ml. of glacial acetic acid and 10 ml. of methanol. Ethyl acetate and water are added and the separated and dried organic layer is taken to dryness. The residue is then treated with 1 ml. of acetic anhydride and 1 ml. of pyridine for eighteen hours at room temperature. Removal of these reagents under vacuum and chromatography on neutral alumina affords 6α-fluoro-21-hydroxy-4,17(20)pregnadiene-3-one 21 acetate.

In accordance with the above procedure but starting with the crude methyl-6α-chloro-3-keto-4,17(20)-pregnadiene-21-oate, the 6α-chloro-21-hydroxy-4,17(20)-pregnadiene-3-one 21-acetate is obtained.

21-acetoxy-4,17(20)-pregnadiene-3-one (3.70 g.) is heated and stirred at 75–100° C. with 1.1 to 2.2 grams of selenium dioxide in 1.35 ml. of dioxane and 15 ml. of water. When reaction to form the 21-acetoxy-16α-hydroxy-4,17(20)-pregnadiene-3-one is at the maximal the solution is filtered with the aid of Supercel (an infursorial earth) and taken to dryness. The residue is taken up in ethyl acetate and washed successively with aqueous sodium bicarbonate, ammonium sulfide, dilute aqueous ammonia, dilute hydrochloric acid and finally with water. The organic solvent is dried, treated with activated charcoal, taken to dryness and chromatographed on silica gel to afford 21-acetoxy-16α-hydroxy-4,17(20)-pregnadiene-3-one.

A solution of 21-acetoxy-16α-hydroxy-4,17(20)-pregnadiene-3-one (400 mg.) in 10 ml. of ether and 1 ml. of tributylamine is treated with 0.2 ml. of thionyl chloride. After ten minutes, the solution is poured into iced sodium dihydrogen phosphate and extracted with ethyl acetate. Removal of the dried solvent leaves a residue which contains 20-chloro-21-acetoxy-4,16-pregnadiene-3-one. This is dissolved in 10 ml. of ethanol to which 1 N sodium chloride is added dropwise until alkalinity persists over a period of ten minutes. Then acetic acid is carefully added to neutrality and the solvent is removed under vacuum. The residue is dissolved in ethyl acetate, washed with water, and chromatographed on silica gel to afford 20,21-epoxy-4,16-pregnadiene-3-one.

To a solution of 200 mg. of 20,21-epoxy-4,16-pregnadiene-3-one in 2 ml. of chloroform and 2 ml. of tetrahydrofuran in a polyethylene bottle at −60° C. is added 2 ml. of 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the organic solvent is washed with sodium bicarbonate and dried. The residue after removal of solvent is treated at room temperature with one ml. of acetic anhydride and one ml. of pyridine. The reaction mixture is taken to dryness under high vacuum on a rotating evaporator and chromatographed on neutral alumina to afford 21-acetoxy-16α-fluoro-4,17(20)-pregnadiene-3-one.

A solution of 325 mg. of 21-acetoxy-16α-fluoro-4,17(20)-pregnadiene-3-one is prepared in 10 ml. of t-butanol, 3 ml. of methylene chloride and 0.4 ml. of pyridine. To the solution is added 1.1 ml. of a solution of N-methylmorpholino oxide-hydrogen peroxide complex in t-butanol. A milligram of osmium tetroxide is added and the solution is stirred at room temperature over night. Excess reagent is then destroyed by stirring the solution vigorously with aqueous sodium hydrosulfite. After filtration, the organic layer is washed with aqueous sodium dihydrogen phosphate and water, dried and removed under vacuum. Chromatography on Florisil affords 16α-fluoro-17α-hydroxy-21-acetoxy-4-pregnene-3,20-dione. Florisil is an activated magnesium silicate made according to U.S. Pat. 2,393,625.

The N-methylmorpholine oxide-hydrogen peroxide is prepared by the following procedure: To a solution of 26 grams (0.25 mole) of N-methylmorpholine in 100 milliliters of tertiary butyl alcohol is added 34 grams (0.50 mole) of fifty percent hydrogen peroxide portionwise, with stirring, and while maintaining the reaction temperature at between thirty and 35 degrees centigrade with water bath. The resulting solution is then diluted to 170 millimeters with tertiary butyl alcohol, maintained at room temperature for 48 hours, and then dried with sixty grams of anhydrous magnesium sulfate for an additional 24 hours. The magnesium sulfate is removed by filtration and the filtrate is distilled to dryness to produce crystalline N-methylmorpholine peroxide. Alternatively, the solution can be titrated for available peroxide and the N-methylmorpholine oxide peroxide used without isolation.

Five hundred milligrams of 21-acetoxy-16α-fluoro-17α-hydroxy-4-pregnene-3,20-dione is dissolved in a mixture of 5 ml. of benzene and 5 ml. of a 1 N-methanolic potassium hydroxide and the solution is allowed to stand at room temperature for ten minutes. The solution is then acidified with acetic acid, diluted with ethyl acetate and washed with water. Removal of the dried solvent leaves a residue of 16α-fluoro-17α,21-dihydroxy-4-pregnene-3,20-dione. This is stirred at room temperature for 70 hours with a mixture of 18 ml. of chloroform, 5 ml. of concentrated hydrochloric acid and 5 ml. of 37% formaldehyde. The chloroform layer is separated and the aqueous layer is extracted several more times with chloroform. The combined organic solvent is washed with aqueous sodium bicarbonate and dried. Removal of the solvent leaves a residue containing 17α,20,20,21-bis(methylenedioxy)-16α-fluoro-4-pregnene-3,20-dione which is further purified by crystallization from methanol.

A suspension of 17α,20,20,21-bis(methylenedioxy)-16α-fluoro-4-pregnene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 17α,20,20,21-bis(methylenedioxy)-16α-fluoro-4,6-pregnadiene-3,20-dione.

Alternately, the 17α,20,20,21-bis(methylenedioxy)-16α-fluoro-4,6-pregnadiene-3,20-dione may be prepared by reaction of the 21-acetoxy-16α-fluoro-17α-hydroxy-4-pregnene-3,20-dione with chloranil according to the above reaction, and then treatment of the resulting 21-acetoxy-16α - fluoro-17α-hydroxy-4,6-pregnadiene-3,20-dione first with methanolic potassium hydroxide, and then with formaldehyde in the presence of concentrated HCl.

In accordance with the procedures of Example 16, but starting with the known 6α-methyl-21-acetoxy-4,17(20)-pregnadiene - 3-one, 6α-chloro-21-acetoxy-4,17(20)-pregnadiene-3-one or the 6α-fluoro-21-acetoxy-4,17(20)-pregnadiene-3-one, or the $\Delta^{4,6}$-analogues thereof, there are obtained the 6α-methyl, 6α-chloro or 6α-fluoro-17α,20,20, 21 - bis(methylenedioxy) - 16α - fluoro-4-pregnene-3,20-dione and the corresponding $\Delta^{4,6}$-analogues thereof.

The 6 - halo - 16α-fluoro-17α-hydroxy-4,6-pregnadiene-3,20-dione compounds used as starting materials are alternately prepared by the following procedures:

Progesterone (10 g.) and chloranil (25 g.) are refluxed in 350 ml. of dry t-butanol for three hours. The residue after removal of the solvent is dissolved in chloroform and extracted thoroughly with 10% aqueous sodium bisulfite, 5% potassium hydroxide and finally water. Removal of the dried solvent and chromatography on neutral alumina affords 6-dehydroprogesterone.

A solution of 3.25 g. of 6-dehydroprogesterone in 325 ml. of methylene dichloride is cooled in an ice bath and treated with 75 ml. of 1.5 N etheral monoperphthalic acid and allowed to stand over night at room temperature. The mixture is poured into excess sodium bicarbonate, and the organic layer is separated and dried. Removal of solvent and crystallization from a suitable solvent affords 6α,7α-oxidoprogesterone.

6α,7α-oxidoprogesterone (1.0 g.) in 75 ml. of glacial acetic acid is saturated at room temperature with anhydrous hydrogen chloride and allowed to stand for four hours at room temperature. It is then poured into water, extracted with chloroform and washed with water and sodium bicarbonate. Removal of the dried solvent and chromatography on neutral alumina affords 6-chloro-6-dehydroprogesterone.

6α,7α-oxidoprogesterone (1.25 g.) is dissolved in 30 ml. of chloroform and treated with 12.5 ml. of a solution prepared from 7 parts of tetrahydrofuran, 4 parts of chloroform and 4 parts of anhydrous hydrogen fluoride. After three days at room temperature, the mixture is cautiously poured into iced potassium carbonate and extracted several times with chloroform. The organic layer is separated, dried and removed. The residue is taken up in 20 ml. of glacial acetic acid and 5 ml. of glacial acetic acid saturated with hydrogen fluoride gas is added. After one hour at room temperature, this mixture is poured into ice and water and extracted with ethyl acetate. After water and sodium bicarbonate washes, the dried solvent is removed and the residue is chromatographed on neutral alumina to afford 6-fluoro-6-dehydroprogesterone.

A solution of 9.0 g. of 6-chloro-6-dehydroprogesterone is prepared in 125 ml. of anhydrous t-batanol. To it is added with stirring 13.6 ml. of ethyl oxalate and 25 ml. of 2.5 N sodium methoxide in methanol at about 50° C. This mixture is stirred under nitrogen at room temperature over night. Then 3.06 g. of sodium acetate and 3.53 ml. of glacial acetic acid in 200 ml. of methanol are added. This solution is cooled in an ice bath and 10.8 g. of bromine in 110 ml. of methanol is added slowly over a half hour period. Then 57 ml. of 2.5 N methanolic sodium methoxide is added and the solution is stirred for five hours at room temperature. The mixture is then poured into water and the precipitate is filtered off and dried. Five grams of this material is dissolved in 100 ml. of benzene, 50 ml. of methanol and 10 ml. of glacial acetic acid. Five grams of zinc dust is added and the reaction mixture is stirred vigorously for four hours. The solids are filtered off and washed with ethyl acetate. The combined organic layer is extracted with dilute sodium bicarbonate and dried. Chromatography on silica gel affords methyl 6-chloro-3-keto-4,6,17(20)-pregnatriene-21-oate.

The above compound is then converted into 6-chloro-21-hydroxy-4,6,17(20)-pregnatriene-3-one, following in sequence the procedures for the preparation of the corresponding $\Delta^4$-compounds.

Various changes and modifications may be made in carrying out the present invention without departing from the spirit and scope thereof. Insofar as these changes and modifications are within the purview of the annexed claims, they are to be considered as part of our invention.

What is claimed is:
1. A compound selected from the group of compounds having the following structural formulas, and the $\Delta^{4,6}$-analogs of said compounds:

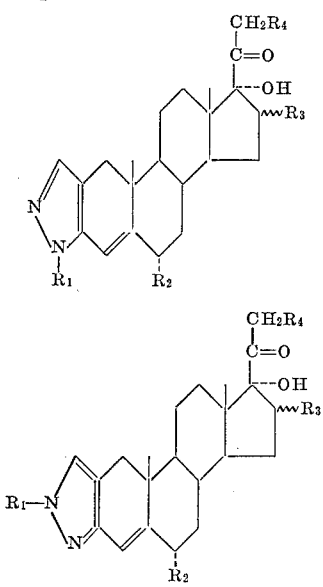

wherein $R_1$ is selected from the group consisting of lower alkyl, lower aralkyl, lower cycloalkyl, aryl, pyridyl, pyridyloxide and pyrimidyl; $R_2$ is selected from the group consisting of hydrogen, $\alpha$-methyl and $\alpha$-fluoro; $R_3$ is selected from the group consisting of $\alpha$-methyl, $\beta$-methyl and methylene; and $R_4$ is selected from the group consisting of fluoro and hydroxy; and 17- and 21-lower hydrocarbon carboxylic acylates, dihydrogen phosphates, alkali metal salts of said dihydrogen phosphates, and pharacologically acceptable salts of the foregoing compounds.

2. A compound as defined in claim 1, selected from the group consisting of 17$\alpha$,21-dihydroxy-16$\alpha$-methyl-20-oxo-2'-phenyl-4-pregneno-[3,2-c]pyrazole and the 17- and 21-carboxylic acylates and 21-phosphates thereof.

3. A compound as defined in claim 1, selected from the group consisting of 17$\alpha$,21-dihydroxy-16$\alpha$-methyl-20-oxo-2'-(p-fluorophenyl)-4-pregneno - [3,2-c]pyrazole and the 17- and 21-carboxylic acylates and 21-phosphates thereof.

4. A compound as defined in claim 1, selected from the group consisting of 17$\alpha$,21-dihydroxy-16$\beta$-methyl-20-oxo-2'-phenyl-4-pregneno-[3,2-c]pyrazole and the 17- and 21-carboxylic acylates and 21-phosphates thereof.

5. A compound as defined in claim 1, selected from the group consisting of 17$\alpha$,21-dihydroxy-16$\beta$-methyl-20-oxo-2'-(p-fluorophenyl)-4-pregneno - [3,2-c]pyrazole and the 17- and 21-carboxylic acylates and 21-phosphates thereof.

6. A compound, as defined in claim 1, selected from the group consisting of 17$\alpha$,21-dihydroxy-6,16$\alpha$-dimethyl-20-oxo-2'-phenyl-4,6-pregnadieno-[3,2-c]pyrazole and the 17- and 21-carboxylic acylates and 21-phosphates thereof.

7. A compound as defined in claim 1, selected from the group consisting of 17$\alpha$,21-dihydroxy-6,16$\alpha$-dimethyl-20-oxo-2'-(p-fluorophenyl)-4,6-pregnadieno - [3,2-c] pyrazole and the 17- and 21-carboxylic acylates and 21-phosphates thereof.

References Cited

UNITED STATES PATENTS 3,148,183 9/1964 Hirschmann et al.

HENRY A. FRENCH, Primary Examiner

U.S. Cl. X.R.

260—239.55, 397.1, 397.3, 397.4, 397.47, 999